US008250457B2

(12) United States Patent
Fainberg et al.

(10) Patent No.: US 8,250,457 B2
(45) Date of Patent: Aug. 21, 2012

(54) ACCELERATION AND OPTIMIZATION OF WEB PAGES ACCESS BY CHANGING THE ORDER OF RESOURCE LOADING

(75) Inventors: Leonid Fainberg, Qiryat Gat (IL); Ofir Ehrlich, Tel Aviv (IL); Gil Shai, Givataim (IL); Ofer Gadish, Raanana (IL); Amitay Dobo, Kibbutz Lahav (IL); Ori Berger, New York, NY (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/245,841

(22) Filed: Sep. 26, 2011

(65) Prior Publication Data

US 2012/0079057 A1 Mar. 29, 2012

Related U.S. Application Data

(63) Continuation of application No. 12/848,559, filed on Aug. 2, 2010.

(60) Provisional application No. 61/213,959, filed on Aug. 3, 2009, provisional application No. 61/308,951, filed on Feb. 28, 2010.

(51) Int. Cl.
*G06F 17/00* (2006.01)

(52) U.S. Cl. .................................................... 715/205

(58) Field of Classification Search .................. 715/205
See application file for complete search history.

(56) References Cited

U.S. PATENT DOCUMENTS

| | | | | |
|---|---|---|---|---|
| 5,802,292 | A | 9/1998 | Mogul | |
| 6,023,726 | A | 2/2000 | Saksena | |
| 6,055,572 | A | 4/2000 | Saksena | |
| 6,067,565 | A | 5/2000 | Horvitz | |
| 6,085,226 | A | 7/2000 | Horvitz | |
| 6,098,064 | A | 8/2000 | Pirolli et al. | |
| 6,272,534 | B1 | 8/2001 | Guha | |
| 6,338,096 | B1 | 1/2002 | Ukelson | |
| 6,385,641 | B1 | 5/2002 | Jiang et al. | |
| 6,578,073 | B1 * | 6/2003 | Starnes et al. | 709/219 |
| 6,834,297 | B1 | 12/2004 | Peiffer et al. | |
| 6,993,591 | B1 | 1/2006 | Klemm | |
| 7,007,237 | B1 | 2/2006 | Sharpe | |
| 7,084,877 | B1 * | 8/2006 | Panusopone et al. | 345/474 |
| 7,113,935 | B2 | 9/2006 | Saxena et al. | |
| 7,243,309 | B2 | 7/2007 | Koay et al. | |
| 7,249,196 | B1 * | 7/2007 | Peiffer et al. | 709/246 |

(Continued)

OTHER PUBLICATIONS

Gardner et al., DOM: Towards a Formal Specification, ACM 2008, pp. 1-10.*

(Continued)

*Primary Examiner* — Cong-Lac Huynh

(74) *Attorney, Agent, or Firm* — Kilpatrick Townsend & Stockton LLP

(57) ABSTRACT

A method for acceleration of access to a web page. The method comprises receiving a web page responsive to a request by a user; analyzing the received web page for possible acceleration improvements; generating a modified web page of the received web page using at least one of a plurality of acceleration techniques; providing the modified web page to the user, wherein the user experiences an accelerated access to the modified web page resulting from the execution of the at least one of a plurality of acceleration techniques; and storing the modified web page for use responsive to future user requests.

18 Claims, 5 Drawing Sheets

U.S. PATENT DOCUMENTS

| | | | | |
|---|---|---|---|---|
| 7,308,490 | B2 | 12/2007 | Peiffer et al. | |
| 7,483,941 | B2 | 1/2009 | Carlson et al. | |
| 7,594,003 | B2 | 9/2009 | Davidson et al. | |
| 7,594,013 | B2 | 9/2009 | Wang et al. | |
| 7,689,663 | B2 | 3/2010 | Kinnan et al. | |
| 7,818,686 | B2 | 10/2010 | Cooke | |
| 7,860,881 | B2 | 12/2010 | Haselden et al. | |
| 7,886,218 | B2 | 2/2011 | Watson | |
| 7,941,483 | B2 | 5/2011 | Narayanan et al. | |
| 7,958,232 | B1 * | 6/2011 | Colton et al. | 709/224 |
| 8,060,518 | B2 | 11/2011 | Timmons | |
| 8,112,703 | B2 * | 2/2012 | Kumar et al. | 715/234 |
| 2002/0078087 | A1 | 6/2002 | Stone | |
| 2002/0078165 | A1 | 6/2002 | Genty et al. | |
| 2004/0030717 | A1 * | 2/2004 | Caplin | 707/103 R |
| 2004/0088375 | A1 | 5/2004 | Sethi et al. | |
| 2004/0215665 | A1 | 10/2004 | Edgar et al. | |
| 2005/0138143 | A1 | 6/2005 | Thompson | |
| 2005/0154781 | A1 | 7/2005 | Carlson et al. | |
| 2005/0198191 | A1 | 9/2005 | Carlson et al. | |
| 2006/0093030 | A1 * | 5/2006 | Francois et al. | 375/240.01 |
| 2007/0022102 | A1 | 1/2007 | Saxena | |
| 2007/0156845 | A1 | 7/2007 | Devanneaux et al. | |
| 2007/0256003 | A1 * | 11/2007 | Wagoner et al. | 715/501.1 |
| 2007/0260748 | A1 * | 11/2007 | Talkington | 709/246 |
| 2008/0005672 | A1 * | 1/2008 | Mestres et al. | 715/700 |
| 2008/0139191 | A1 * | 6/2008 | Melnyk et al. | 455/419 |
| 2008/0155425 | A1 * | 6/2008 | Murthy et al. | 715/738 |
| 2008/0228772 | A1 | 9/2008 | Plamondon | |
| 2008/0228911 | A1 * | 9/2008 | Mackey | 709/224 |
| 2009/0037454 | A1 * | 2/2009 | Sampson et al. | 707/102 |
| 2009/0125481 | A1 * | 5/2009 | Mendes da Costa et al. | 707/3 |
| 2009/0240698 | A1 * | 9/2009 | Shukla et al. | 707/10 |
| 2009/0300111 | A1 * | 12/2009 | Rana | 709/203 |
| 2010/0149091 | A1 * | 6/2010 | Kota et al. | 345/156 |
| 2010/0169455 | A1 * | 7/2010 | Gorham | 709/218 |
| 2010/0269050 | A1 * | 10/2010 | Kirkby et al. | 715/744 |
| 2010/0281357 | A1 * | 11/2010 | Fu et al. | 715/234 |
| 2010/0299589 | A1 * | 11/2010 | Yamada | 715/235 |
| 2010/0306643 | A1 * | 12/2010 | Chabot et al. | 715/234 |
| 2011/0066676 | A1 * | 3/2011 | Kleyzit et al. | 709/203 |
| 2011/0113000 | A1 * | 5/2011 | Marlow | 706/47 |
| 2011/0289486 | A1 * | 11/2011 | Revinskaya et al. | 717/129 |
| 2012/0030224 | A1 * | 2/2012 | Cohen et al. | 707/758 |
| 2012/0054595 | A1 * | 3/2012 | Mylroie et al. | 715/234 |

OTHER PUBLICATIONS

Bogdanov et al., A Prototype of Online Privacy-Preserving Questionaire System, Google 2010, pp. 1-6.*

Seifert et al., Identification of Malicious Web Pages with Static Heuristics, IEEE 2008, pp. 91-96.*

Chen et al., Building a Scalable Web Server with Global Object Space Support on Heterogeneous Clusters, Google 2001, pp. 1-8.*

Jing et al., Client-Server Computing in Mobile Environments, ACM 1999, pp. 117-157.*

Wikipedia, "Web accelerator", Retrieved on Mar. 14, 2012, from http://en.wikipedia.org/wiki/Web_accelerator, Jan. 11, 2012, p. 1-3.

U.S. Appl. No. 12/848,611, Restriction Requirement mailed Apr. 13, 2012, 6 pages.

U.S. Appl. No. 13/245,711, Notice of Allowance mailed Apr. 24, 2012, 10 pages.

* cited by examiner

```
<script>
var __fwCurrentPos = undefined;
__fwCopyWrittenData = function(startElemId, endElemId, targetElemId) {
        var startElem = document.getElementById(startElemId);
        var nodeToPutAfter = document.getElementById(targetElemId);
        var nodeToAdd = startElem.nextSibling;
        var parentNode = startElem.parentNode;
        while ( nodeToAdd != null && nodeToAdd.id != endElemId) {
                var nextNode = nodeToAdd.nextSibling;
                if (nodeToAdd.tagName != 'SCRIPT') {
                        parentNode.removeChild(nodeToAdd);

                        if (nodeToAdd.getElementsByTagName) {
                                var childScripts = nodeToAdd.getElementsByTagName('SCRIPT');
                                if (childScripts.length > 0) {
                                        for (var scriptIndex = 0; scriptIndex < childScripts.length;
scriptIndex++) {
                                                var childScript = childScripts[scriptIndex];
                                                childScript.parentNode.removeChild(childScript);
                                        }
                                }
                        }

                        if (nodeToPutAfter.nextSibling) {
                                nodeToPutAfter.parentNode.insertBefore(nodeToAdd,
                                        nodeToPutAfter.nextSibling);
                        } else {
                                nodeToPutAfter.parentNode.appendChild(nodeToAdd);
                        }
                        nodeToPutAfter = nodeToAdd;
                }
                nodeToAdd = nextNode;
        }
        try {
                // sometimes errors happen when attempting to remove from dom. The removal from the
dom is not crucial, so it's silenced.
                parentNode.removeChild(nodeToAdd);
                parentNode.removeChild(startElem);
        }
        catch (e) {
        }
};
```

FIG. 4A

```
__fwCloseOpenedElements = function(){
        document.write("<div id='__fwTempSentinent'></div>");
        var tempSentinent = document.getElementById('__fwTempSentinent');
                var elem = tempSentinent.parentNode;
        while (elem.tagName != 'BODY') {
                document.write('</' + elem.tagName + '>');
                elem = elem.parentNode;
        }

        tempSentinent.parentNode.removeChild(tempSentinent);
}

__fwCloseOpenedElementsByCurrentPosition = function(){
        document.write("<div id='__fwTempSentinent'></div>");
        __fwCloseOpenedElements('__fwTempSentinent');
        var tempSentinent = document.getElementById('__fwTempSentinent');
        tempSentinent.parentNode.removeChild(tempSentinent);
}

__fwCloseOpenedElements();

</script>
```

FIG. 4B

```
<div id='ID_start' style='display:none'></div><script src="SOURCE">
</script>
<script>__fwCloseOpenedElementsByCurrentPosition();</script>
<div id='ID_end' style='display:none'></div><script>__fwCopyWrittenData('ID_start', 'ID_end',
'ID')</script>
```

FIG. 4C

```
<div id='ID_start' style='display:none'></div><script>
  CONTENT;
</script>
<script>__fwCloseOpenedElementsByCurrentPosition();</script>
<div id='ID_end' style='display:none'></div><script>__fwCopyWrittenData('ID_start', 'ID_end',
'ID')</script>
```

FIG. 4D

ACCELERATION AND OPTIMIZATION OF WEB PAGES ACCESS BY CHANGING THE ORDER OF RESOURCE LOADING

CROSS-REFERENCES TO RELATED APPLICATIONS

This patent application is a continuation of and claims priority to U.S. patent application Ser. No. 12/848,559, filed on Aug. 2, 2010, which claims priority both to U.S. provisional patent application 61/213,959 filed Aug. 3, 2009, and further to U.S. provisional patent application 61/308,951 filed Feb. 28, 2010. All three of these applications are incorporated by reference in their entirety.

FIELD OF THE INVENTION

The present invention relates generally to accesses to web pages, and more specifically to the acceleration and/or optimization of access speed to such web pages from the user's experience perspective.

BACKGROUND OF THE INVENTION

The traffic over the world-wide-web (WWW) using the Internet is growing rapidly as well as the complexity and size of the information moved from sources of information to users of such information. Bottlenecks in the movement of data from the content suppliers to the users, delays the passing of information and decreases the quality of the user's experience. Traffic is still expected to increase faster than the ability to resolve data transfers over the Internet.

Prior art suggests a variety of ways in an attempt to accelerate web page content delivery from a supplier of the content to the users. However, there are various deficiencies in the prior art still waiting to be overcome. It would be advantageous to overcome these limitations, as it would result in a better user experience and reduction of traffic load throughout the WWW. It would be further advantageous that such solutions be applicable with at least all popular web browsers and/or require neither a plug-in nor a specific browser configuration.

BRIEF SUMMARY OF THE INVENTION

Certain embodiments of the invention include a system for acceleration of access to web pages. The system comprises a network interface enabling communication of one or more user nodes with one or more web servers over a network for accessing web pages stored in the one or more web servers; an acceleration server coupled to the network interface for modifying web pages retrieved from the one or more web servers using at least one acceleration technique, the modified web pages accelerating access to the web page to one or more user nodes; a first cache connected to the acceleration server and the one or more user nodes and operative to cache information associated with requests directed from the one or more the user nodes to the acceleration server; a second cache connected to the acceleration server and the one or more web servers and operative to cache information associated with requests directed from the one or more web servers to the acceleration server; and a memory coupled to the acceleration server and containing a plurality of instructions respective of the at least one acceleration technique.

Certain embodiments of the invention further include a method for acceleration of access to a web page. The method comprises receiving a web page responsive to a request by a user; analyzing the received web page for possible acceleration improvements; generating a modified web page of the received web page using at least one of a plurality of acceleration techniques; providing the modified web page to the user, wherein the user experiences an accelerated access to the modified web page resulting from the execution of the at least one of a plurality of acceleration techniques; and storing the modified web page for use responsive to future user requests.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIGS. 4A, 4B, 4C and 4D are exemplary scripts of an acceleration technique.

DETAILED DESCRIPTION OF THE INVENTION

Figure 1:
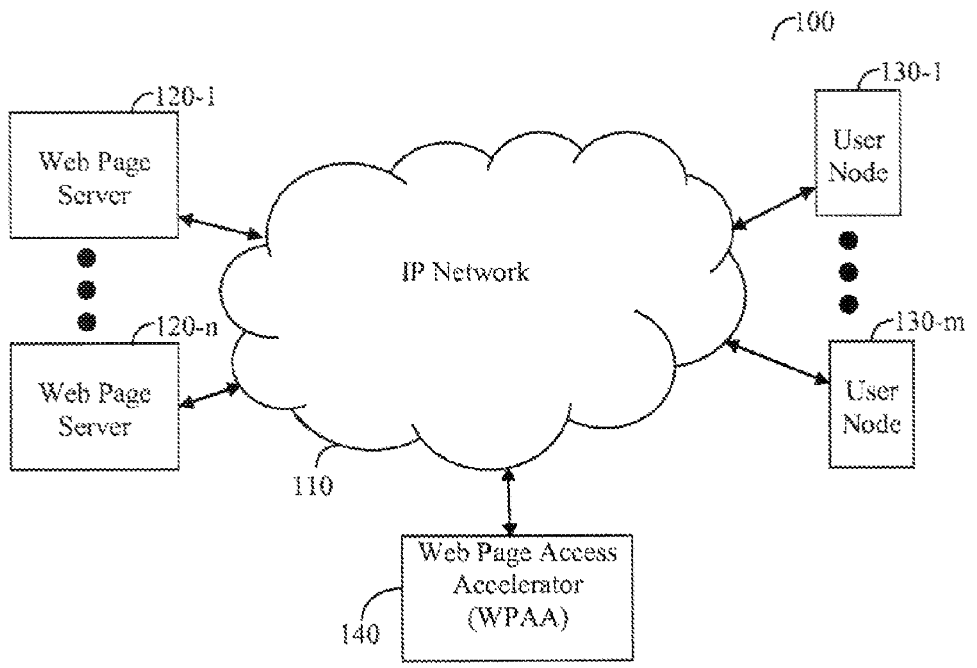
FIG. 1 is a schematic block diagram of a system for acceleration of web pages access.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In an exemplary embodiment of the invention, a web access acceleration system is placed in the path between the user nodes and the web servers and is responsible for integrating the acceleration mechanisms to the web pages selected for acceleration. The methods for web access acceleration include, for example, parallel loading of a Cascading Style Sheets (CSS) style of a web page, postponement of execution of Javascript code of a web page, maintaining script context when modifying the DOM, causing items to be pre-fetched into a browser's cache, web-site and browser transparent pre-fetching, pre-fetching of resources of subsequent or other pages of a web site, pre-fetching of resources of the same web page, fetching linked pages on demand prior to link access, a path dependent delivery of a web page to a user, automatic generation of combined image containers, caching of dynamic data, intelligent caching of resources, processing links in the background, and postponing of iframes.

FIG. 1 depicts an exemplary and non-limiting schematic block diagram of a system 100 for acceleration of web pages access in accordance with an embodiment of the invention. To a network 110 there are connected one or more web page servers 120, each providing content typically using formatted documents using, for example, the hypertext markup language (HTML). The network may be a local area network (LAN), a wide area network (WAN), a metro area network (MAN), the Internet, the world-wide-web (WWW), the like, and any combination thereof. One or more user nodes 130 that are viewers of such web pages content are also connected to the network. A user of a user node 130 typically browses the content using a web browser that is enabled to display the web pages. By using, for example but not by way of limitation, a uniform resource locator (URL) the browser is capable of accessing a desired web page.

The network 110 is also connected a web page access accelerator (WPAA) 140. In accordance with the invention instead of providing web page content directly from a web page server, for example, a web page server 120-1, to a user node, for example, a user node 130-1, traffic is directed through the WPAA 140, when applicable, i.e., when configured for accelerated access. Accordingly, a request for web page content is directed through the WPAA 140 that is equipped with various acceleration mechanisms as further detailed herein below. In one embodiment of the disclosed invention, the web servers 120 are part of a server farm (not shown). In a further embodiment thereof, the WPAA 140 is provided as part of the server farm. In yet another embodiment of the invention, the WPAA 140 is integrated as an integral part of a web page server 120.

Figure 2:
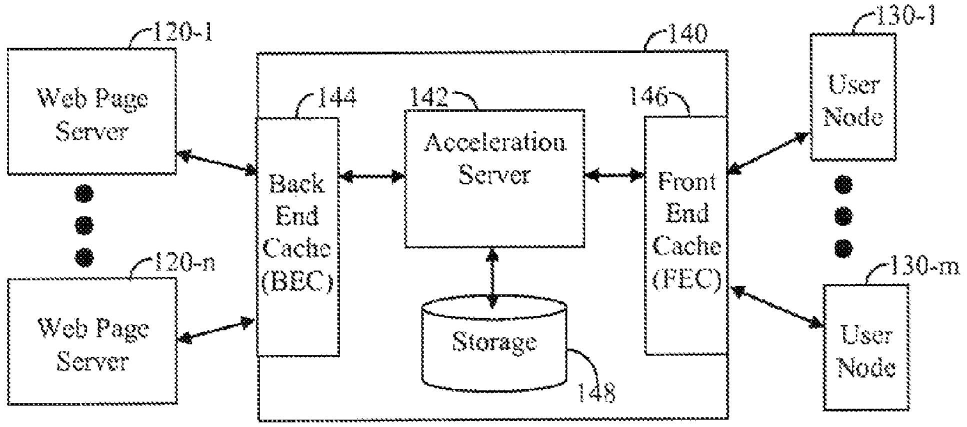
FIG. 2 is a schematic diagram of the data flow in a system for acceleration of web pages access.

FIG. 2 shows an exemplary and non-limiting schematic diagram of the data flow in a system for acceleration of web pages access in an embodiment of the invention. In addition, the details of the structure of the WPAA 140 are also shown. For simplicity reasons and without limiting the scope of the invention, the network interface is removed. However, a network type interface is the typical way for components of the network to communicate with each other.

The WPAA 140 comprises an acceleration server 142 that is connected to the storage 148. The storage 148 typically holds instructions for the execution of methods, described herein below in more detail, that result in accelerating the transfer of web pages content to a user wishing to access such content. Under the control of the acceleration server 142, there is a hack-end cache (BEC) 144 connected to the acceleration server 142 and to the one or more web page servers 120-1 through **120-*n*. The BEC 144 handles requests directed from the acceleration server 142 to the one or more web page servers 120-1 through 120-*n*. By caching information associated with web servers' requests in the BEC 144, the overall access to web page content is accelerated. Under the control of the server 142, there is a front-end cache (FEC) 146, connected the acceleration server 142 and to the one or more user nodes 130-1 through 130-*m*. The FEC 146 handles requests directed from the one or more user nodes 1304 through 130-*m* to the acceleration server 142. By caching information associated with user nodes' requests in the FEC 146**, the overall access to web page content is further accelerated.

Figure 3:
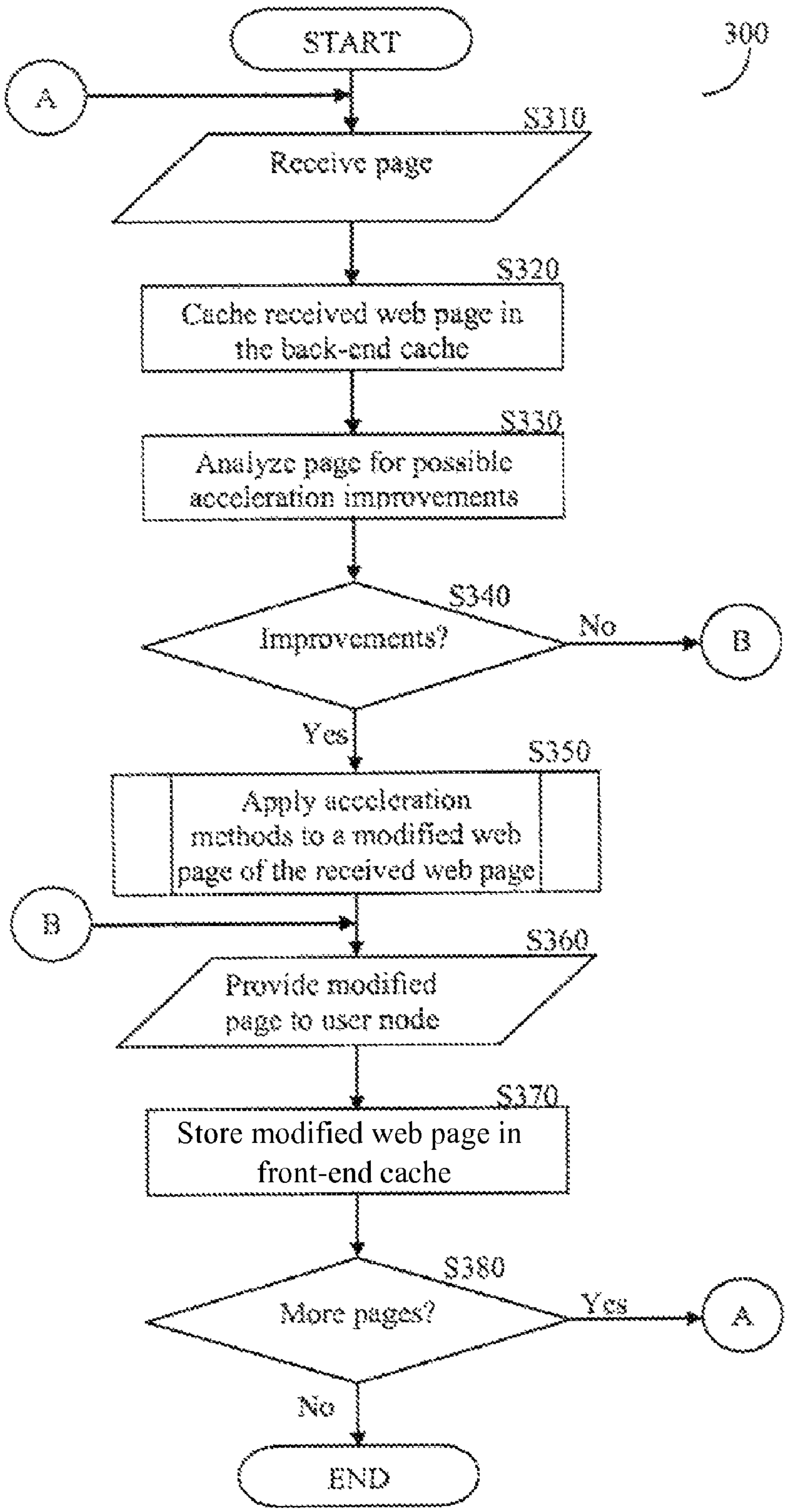
FIG. 3 is a flowchart of the processing performed for the purpose of generating web pages that accelerate access.

FIG. 3 shows an exemplary and non-limiting flowchart 300 of the processing performed for the purpose of generating web pages that accelerate access in accordance with an embodiment of the invention. In 5310, a page is received, for example by the WPAA 140, in response to a request to receive a web page from, for example, web page server 120. Optionally, in 5320, the received web page is stored in a cache, for example, in the BEC 144. In S330, the received web page is analyzed by the acceleration server 142 to determine whether acceleration improvements may be achieved. In 5340, it is checked whether improvements were determined to be achievable, and if so execution continues with 5350; otherwise execution continues with S360. In 5350, the received web page is modified into a modified web page that contains one or more acceleration techniques discussed herein below in more detail. In S360, the modified or the received web page is provided to the user node 120 that requested the web page. Optionally, in S370 the modified web page or the received web page, as may be appropriate, is stored in a cache, for example FEC 146. In S380, it is checked whether additional pages are to be handled, and if so execution continues with S310; otherwise, execution terminates.

While reference is made hereinabove to web pages, it can equally refer to portions of web pages, resources of a web page, and the like, without departing from the scope of the invention. In one embodiment of the invention, the method disclosed above may be performed by the WPAA 140. In other embodiments of the invention, the method can be integrated in a web page server such as web page server 120.

While the description hereinabove was made with respect to one particular system, other systems may be deployed to benefit from the teachings hereinabove and herein below. In one exemplary and non-limiting embodiment of the invention, a system that works as a plug-in/filter/extension to one or more web servers is used. The flow of data through the system is the same as described with respect of the system in FIG. 1, however, it may also utilize knowledge about the data stored on the web site, such as but not limited to, page templates and images. In yet another exemplary and non-limiting embodiment of the invention, the system is a plug-in for web site integrated development environment (IDE). Using the plug-in, the inventions herein are integrated into the web site during its development. The plug-in therefore enables at "compilation" or "build" process of the IDE, changes to the web site coding made by the user of the web site developer according to the inventions. This may take place during development or automatically implemented during development. In yet another exemplary and non-limiting embodiment a utility containing, for example and without limitation, a command line component, a user interface (UI) component or any other interface, is run on the designed web site code after it is ready, and/or in one or more points-in-time during the development thereof, to transform the web site code by employing the inventions herein.

Following are descriptions of acceleration techniques used with respect to, for example, S350, discussed above. However, the use of such techniques may be a part of other embodiments which are specifically included herein.

I. Parallel Loading of a CSS Style of a Web Page

Web pages may include one or more style parts, which allow the separation of the content of the web page from its presentation. The style can be changed and cause the page to look entirely differently, despite the fact that it contains the exact same content. The Cascading Style Sheet (CSS) is the mechanism that allows doing so in HTML documents. CSS is a "language" that a browser can interpret to render the display the page. Attaching a style to a HTML page can be done by either embedding the text of the style inside the HTML document, in one place or dividing the text to several parts and embedding them in different places of the HTML document or putting the text of the style in an external file and putting a directive inside the HTML document to load this file and to use the style definitions in it. Style definitions can be very large (e.g., hundreds of kilobytes), especially if a third-party standard file is used and both abovementioned ways have the same disadvantage. While the data of the style is being loaded, the parsing and processing of the page is halted and resumed only after the style data has been loaded and processed. Separating style definitions to several parts helps to spread this delay all over the document, but the overall delay remains.

In accordance with certain aspects of the invention, the problem is overcome by forcing the style data to load in parallel to the rest of the data. This is achieve by moving the style data from their original position, embedded into the HTML and/or taken from external file(s), to one or more external files which can be located anywhere. The HTML is then changed to load these new external files in any asynchronous way, as further discussed in "Techniques of bringing Items to the Browser's Cache" herein below. During the loading process, after such a change, the browser of a user node 130, is unaware that the external files contain style data and treats the external files as merely containing raw data. For every one of these external files, after its loading is finished, which is determined differently for every fetch alternative, a new tag is dynamically inserted into the document. The tag is not inserted into the text of the document, but into the logical representation thereof, which is kept by the browser as a document object model (DOM). This tag instructs the browser to apply a new style, which is located in the same file loaded previously, in parallel to other loads, thereby saving on access time. It should be noted that the application of the style remains serial, however, as this file was already loaded and resides in the browser's cache on user node 130, it is being read from there and a new request is not being sent to fetch it. This way, the loading of the style data is done in parallel to fetching other data items and, though it does occupy some of the bandwidth, it does not delay the loading and processing of the HTML page and its resources, by increasing parallelism of the operation. Resources of an HTML page include, but are not limited to, stylesheet files, Javascript and other script files, images, video and any other parts of the pages which are not embedded in the HTML.

In one embodiment of the invention, a post processing tool parses a web page prepared by a developer and transforms it into a parallel loading capable web page based on the principle described above. In another embodiment, the WPAA 140 intercepts the web page and parses it prior to sending it out to the user. The original web page may reside in the BEC 144. The acceleration server 142 based on instructions contained in the storage 148 parses the web page in accordance with the invention described above and provides to the user a parallel loading capable web page, which may also be stored in FEC 146 for future use by other user nodes 130.

II. Postponing Execution of Javascript Code in a Web Page

Typical web browsers are capable of handling scripting languages which allow them to make the web pages more interactive, rather than just contain text and media. One of the more popular scripting languages, supported by practically all known browsers, is Javascript. Javascript code may be embedded into the HTML page in one or more places, and/or loaded from one or more external files. Just like with stylesheets, discussed hereinabove, loading and running Javascript is done serially to the rest of the processing of the web page. Thus, loading and running Javascript code decreases the speed in which the whole webpage is loaded.

Realizing that most of the Javascript code is used for "behind the scenes" functionality and does not contribute to the way the webpage looks like. Thus, it would be better to load and run the Javascript after the visible portion of the web page has been downloaded and shown. According to an embodiment of the invention, the HTML page is scanned for script tags and then moved to a later place in the HTML page. This location can be at the end of the document, but is not limited thereto. Moving of the tags can be done by actually moving them, or otherwise, adding a "defer" attribute on the tags, which defers the respective Javascript execution to a later point. When moving the tags, it is important to keep the order between them to ensure proper execution. Many times a Javascript tag relies on pieces of code that were defined or executed in one or more of the tags before it.

It should be noted that the Javascript code may be sensitive to its location in the HTML page, thus a straightforward movement of the script tag may not be suitable. In such a case, the original position of the script in the page is marked by either a tag with a unique "id" attribute or in any other way. At a later position in the page, the respective code is "injected" into its original position, i.e., in the DOM.

A non-limiting sequence for postponing the execution of Java script code would be: while processing the page, for example, by the WPAA 140, marking the script tag location by a marker and moving the script tag content, which can be a code or a link to an external file containing the code, to a later position, wrapped by additional code, and while maintaining the order of the tags; and when the page is processed by the browser of a user node 130, the original position of the script is processed without a delay and when the browser reaches the new position of the code, it triggers the wrapper previously inserted there. The wrapper writes the original code at its original position in the DOM. This automatically causes the browser to run the code, but in the context of its original position.

In one embodiment of the invention, a post-processing tool parses a web page prepared by a developer for Javascripts and moves them in accordance with the principle described above. In another embodiment, the WPAA 140 intercepts the web page and parses it prior to sending it out to a user node 130. The original web page may reside in the BEC 144. The acceleration server 142 based on instructions contained in the storage 148 parses the web page in accordance with the invention described above and moves Javascripts of the modified web page, which may also be stored in the FEC 146 for future use by other user nodes 130.

While the description above was made with respect to Javascript, it should not be viewed as restricting the scope of the invention which is relevant for any browser scripting language, including but not limited to, VBscript, Silverligh'™, and Flash.

III. Maintaining Script Context when Modifying the DOM

Executing scripts may introduce new content into the web page by modifying the respective DOM. Many times this is performed under the assumption that when the script runs, the parsing of the page by the browser reached only the script's position. Thus, the script may use browser functions like "document.write( )" and "document.writeInO" to introduce the new content. Typically, these functions write the new content to the current parsing position of the browser just after the position of the script tag which is reached. However, if these functions are executed from another location, they modify the DOM in a different way than originally intended. If they are run after the web page has finished loading, they overwrite the entire web page, as the parsing position these functions use is brought to the beginning of the page once it finished loading.

According to an embodiment of the invention, the problematic functions are overwritten so that instead of writing the new content into the current parsing position, the new functions write it into, or after if applicable, the original position of the script tag. Inside these new functions, the text passed to the function is converted to a subtree of the DOM. The original document.write( ) and other similar functions do it themselves. Then, the new sub-tree is inserted into the DOM to the required location previously marked, for example, by a unique "id" attribute. For some browsers, the original script content is inserted but not executed, so in one embodiment an additional step is required where the browser is instructed to execute the code.

In one embodiment of the invention, a post-processing tool parses a web page prepared by a developer for tagging the scripts in accordance with the principle described above. In another embodiment, the WPAA 140 intercepts the web page and parses it prior to sending it out to a user node 130. The original web page may reside in the BEC 144. The acceleration server 142 based on instructions contained in the storage 148 parses the web page in accordance with the invention described above and tags scripts in the modified web page, which may also be stored in the FEC 146 for future use by other user nodes 130

IV. Acceleration Technique for Running Scripts Outside of Their Positions in a Web Page File One of the web time loading acceleration techniques is to move <script> tags to the end of the document. This way running of scripts, which can take a long time, does not slowdown the rendering of the page. Many scripts are written to be aware of their position in the web page. For example, some scripts create images and Flash components at the same place where they are located. Thus, moving such scripts to another location, thereby stopping them from slowing down the page loading, causes these components to be written to the page in the wrong place.

According to an embodiment of invention, the script writes everything to the new position and then copies everything that was written in this new location to the original location. Part of what is written can contain additional scripts that can write data of their own, this data should also be copied to its correct position.

Following is an example of the principles of the invention that parses an HTML page and postpones the script to the end of the page, while making sure anything the scripts writes to the web page is then written to the original position. With this aim, the exemplary script code provided in FIGS. 4A and 4B is added at the end of the <body> tag. In addition, every <script> tag in the page is identified. If the <script> tag is an external script, i.e., it has a "src" attribute, then this attribute is saved to the variable SOURCE and deleted from the element. If the <script> tag already includes an "id" attribute, the "id" attribute is saved to the variable ID. The SOURCE and ID variables are kept in the memory when and where the page is being processed. If not, a unique id is generated, the "id" attribute is set to be this value and saved to the variable ID. Then, the exemplary code shown in FIG. 4C is added at the end of the <body> tag. For an internal script, i.e., the script has content and does not have a "src" attribute, then the script's content is saved to the variable CONTENT and then deleted. If the script tag already includes an "id" attribute, it is saved in the variable ID. If not, a unique id is generated, the "id" attribute is set to the generated value and then saved in the variable ID. Then, the exemplary code shown in FIG. 4D is added at the end of the <body> tag.

V. Acceleration Technique for Causing Items to be Fetched into a Browser's Cache By having data pre-stored in a browser's cache access time to the data item is reduced. Therefore, a need arises, at times, to bring data items to the browser's cache in advance or in anticipation of their future use. This pertains, for example and without limitation, to prefetching/preloading of a subsequent page or resources thereof, fetching resources of the same page earlier or fetching resources in parallel to the loading of the page, and the likes. Once the resources are in the cache of the browser, the browser rather than accessing the data item remotely could fetch them from the browser's cache without connecting to an external server to read data times, hence be exposed to delays.

A couple of solutions are shown to achieve the desired results. A first approach is used with respect to AJAX, which is a mechanism supported by typical browsers to read from a server asynchronously. The code which initiates an AJAX request receives an event once a page's resource is loaded or, otherwise, in case of an error. Using this mechanism, any resource required in the future or that needs to load in parallel can be fetched. If the purpose is to load the resource in parallel, the resource is used upon the completion event. While appropriate in some cases, this mechanism is limited to fetching resources from the original domain only, that is, resources located in a different domain cannot be fetched. A second approach is to use HTML tags which load external resources. These tags are placed in the text of the HTML, or any referenced external resource, or otherwise inserted dynamically into the DOM using a scripting language. The tags can be, but are not limited to, "link", "script" and "image". If anything needs to be done when a resource finishes loading, an event handler, e.g., "onload" or "onerror" handlers, respective of these tags is used. When using a tag to load a resource it was designed to use, e.g., using SCRIPT tag to load a Javascript file or using a LINK tag to load a stylesheet, the tags must be configured to load only that resource and do nothing else. For a script tag, it can be achieved, among others, using its TYPE attribute; for a link tag, its MEDIA attribute, and others, may be used. Some of these tags stop the processing of the document when used, so they are inferior when used for the required purpose. However, all these tags let the page load a resource from any domain and is therefore a more flexible solution. Instead of creating tags, the same technique may be used by creating script objects. For example, instead of creating an "image" tag, a new Image object can be created. Pointing the Image source to the relevant file achieves the same purpose without actually introducing new tags to the DOM.

In one embodiment of the invention, a post-processing tool parses a web page prepared by a developer for tagging the scripts in accordance with the principle described above. In another embodiment, the WPAA 140 intercepts the web page and parses it prior to sending it out to a user node 130. The original web page may reside in the BEC 144. The acceleration server 142 based on instructions contained in the storage 148 parses the web page in accordance with the invention described above and tags the scripts in a modified web page, which may also be stored in the FEC 146 for future use by other user nodes 130.

VI. Pre-Fetching Resources of the Same Page

The sequence of loading a web page, along with its resources is inefficient. The protocols do not utilize the network to use the entire available bandwidth at all times. Thus, as the page is parsed and scripts executed, every resource is read from the network only immediately prior to its use. However, in many cases it is possible to bring data much earlier in the page load process. This is specifically useful during periods where the network's bandwidth is not fully utilized.

In accordance with the principles of the invention, the web page's resources are fetched earlier during the load sequence of the web page using one or more of the "Techniques of Bringing Items to the Browser's Cache" discussed herein. This way, the network is better utilized and when the resource is needed, it is already in the cache, thus it is not necessary to read it from the network again.

In one embodiment of the invention, a post-processing tool parses a web page prepared by a developer and inserts the code which loads page's resources to the cache earlier in the page in accordance with the principle described above. The decision about which resources to prefetch and where in the HTML to put the prefetch code can be hard coded, configurable, or deduced by the tool. In another embodiment, the WPAA 140 intercepts the web page and parses it prior to sending it out to a user node 130. The original web page may reside in the BEC 144. The acceleration server 142 based on instructions contained in the storage 148 parses the web page in accordance with the invention described above and inserts the code which loads it to the cache earlier in the page, which may also be stored in the FEC 146 for future use by other user nodes 130.

VII. Automatic Generation of Image Containers

In many web pages, most of the requests to the server are made to bring images. As every request includes a "handshake" with the web server and many times TCP connection time, every such a request has an overhead. One way to deal with the problem is to combine two or more images in a single image container, then a browser can fetch the two or more images using only one request. One known technique to create such a container is typically referred to as CSS sprite. This technique is to combine several images into one "tapestry" image, referred to as a "sprite" and to bring it in a single request. Then, a CSS is used to define different regions in the combined image and enable the use of each such a region as a standalone image. This technique has been used till today in several ways: a) manually combining images into a sprite as part of the design on a web site; or, b) there are web sites which allow a user to upload a series of images and download the combined image and the CSS file which the browser will use to separate it back to the original images. Combining images can be also done by using the MHTML, format (understood by the Microsoft Internet Explorer browser), the data:uri format (understood by most web-kit based browsers such as Mozilla Firefox), and others.

Existing solutions automatically combine every a few images in a web page into a sprite. This combination is created by in the web server, thus the web page is transformed before it ever leaves the server on its way to the end-user. There are two problems with the mechanism: a) for web pages with dynamic data, many times only part of the images is common to all the instances of the web page and other images change. For example, the home page of Facebook contains different images for different users, but the images that create the background are always the same. Thus, images cannot be blindly combined. When designing a web site, sprites can be designed to automatically separate between the different kinds of images (as it knows the structure of the web site). A system which is placed outside the web server does not have this knowledge; and b) there is a conflict between the need to put as many images as possible in the sprite (to reduce latency) and the fact that no image will be displayed until the entire sprite is brought from the server and thus there is a need to put fewer images in the sprite.

In accordance with the principles of the invention, the solution is a mechanism that decides which images should be placed in every image container. The factors are, but not limited to, which images are common to all instances of a web page and what images are visible on a common display when the web page is loaded. In the case of images that are common to every instance of a page a hard coded approach may be used, a configuration notification, or otherwise learned by the system over time by analyzing the web pages passing though it and/or images passing through it. In the case of images visible on a display the size of the display can be determined automatically by analyzing the incoming headers, heuristically, by assuming common display sizes or both. Once the display size was determined, one or more containers can be generated. For example, one container may be generated for the visible items and one container for the items outside the immediate or initial display boundaries, i.e., those display items that the user needs to scroll to. Alternatively, a container may be generated for the visible images and no container at all for the ones outside the visible area. Other criteria may be used, for example, all the images which create the background should be part of one container and all the other images may be divided between other containers/left alone (even if other images are common to all instances of the page and are in the visible area). Another embodiment may use a criterion of placing the images common to all users in one container and then placing the images which change among requests from different users into another container.

In one embodiment of the invention, a post-processing tool parses a web page prepared by a developer for creating the sprites in accordance with the principles described above. In another embodiment, the WPAA 140 intercepts the web page and parses it prior to sending it out to a user node 130. The original web page may reside in the BEC 144. The server 142 based on instructions contained in the storage 148 parses the web page in accordance with the invention described above and generates the sprites for the modified web page. The modified web page may also be stored in the FEC 146 for future use by other user nodes 130.

VIII. Postponing of iframes iframes are pieces of a HTML page which are other HTML pages. Every iframe has its own address, so every iframe requires one or more requests, iframes are supposed to load and run in parallel to the parent document, but in practice it is not always so and many time they introduce a delay to the loading of the page.

In most cases, the content inside the iframe is not the primary content of the web site, and many times not even in the area that is visible when the site is loaded. Thus, the iframe tags in the <html> tag can be replaced by placeholders, for example without limitations, tags with a unique id, and a code can be inserted further in the html which puts an iframe tag into its original placeholder. The placeholder can be an empty iframe tag and the code just directs the tag to the address the original iframe pointed.

In one embodiment of the invention, a post-processing tool parses a web page prepared by a developer for tagging the iframes in accordance with the principles described above. In another embodiment, the WPAA 140 intercepts the web page and parses it prior to sending it out to a user node 130. The original web page may reside in the BEC 144. The acceleration server 142 based on instructions contained in the storage 148 parses the web page in accordance with the invention described above and for tagging the iframes for the modified web page. The modified web page may also be stored in the BEC 146 for future use by other user nodes 130.

IX. Splitting Combined Web Page Resources

Many of web page load time optimization techniques include combining web page's resources such as, but not limited to, images, style sheets, Javascripts, and others. The aim is to reduce the impact of latency and server side request processing time. However, the farther a client is from a server, the worse the bandwidth between them is. Therefore, though the impact of latency and request processing time is reduced, the entire data may be transferred more slowly than it would otherwise be sent in its non-combined state.

According to an embodiment of the invention, the combined resource is split into several, but not many, containers that are downloaded at the same time. The number of containers is between a predefined range (upper limit and lower limit) that is set to a value to overcome a connection-perdomain limit of a user's browser. In some cases, the containers should be downloaded from different domains/sub-domain to overcome the browser's connection-per-domain limit. For example, combining two hundred small images into four CSS sprites would be more efficient than either leaving the two hundred images as is or combining all of them into one big sprite. It should be noted that this embodiment may be performed by a post-processing tool or the WPAA 140.

X. Viewport Prioritization

Once a webpage is loaded, only a part of it is immediately visible. The visible part is called "viewport", which basically is everything that is viewable "above the fold", and to increase the speed a web page is loaded, as far as the user experience is concerned, this part should be fully loaded before the invisible part starts loading. Many times, the order of page's resources, e.g., iframes, Javascript files, CSS files, images, and so on, as they are defined in the HTML web page, does not correspond to their actual location on the screen. The browser requests the resources in the order they are placed in the HTML file, due to the sequential nature of the parsing of the HTML file. However, in many cases, this causes resources appearing lower in the screen, and typically resources that do not appear in the viewport at all, to be fetched before they are needed. This causes some resources in the viewport to be fetched later than actually would be beneficial to the user, reduces utilization of bandwidth, and unnecessarily uses connections whose number is limited by the browser.

According to an embodiment of the invention, the viewport prioritization solution consists of two parts. The first part is a script that runs on the web page and collects information about the location of every element of the web page, including elements that are defined inside iframes. This script reports to the server the collected data, in either raw or processed form. The second part is a component which analyzes the collected data. For the combined resources, the order of the resources in the combined files is defined according to their position in the screen, sorted by their position with respect of the Y-axis. For the regular resources, a script is added to the beginning of the web page which asynchronously preloads the resources according to their position in the screen. Thus, when the browser tries to fetch the resource during rendering, the resource is already in the cache. Also, all the resources which are not in the viewport are postponed until all the resources in the viewport are loaded. The viewport is typically determined separately for every user during the rendering of the page, or defined heuristically for all clients/groups of clients. It should be noted that this embodiment may be performed by the post-processing tool or the WPAA 140.

XI. Background Image Management for Web Pages

On a typical web page, part of the images are actual images defined by <img> tags on a page and part of the images are background images defined in various styles. All the images from the <img> tags are fetched when the page is loaded, but not all the images defined in the style are fetched. Only when an element uses the style is the image fetched. When statically analyzing the web page (for pre-fetch, image combining or any other purpose), it is difficult to understand which images are actually part of the page and which images are just defined in the styles but are not actually used by the page.

The solution is based on a client side script (Javascript, for example) which scans, according to predefined criteria, some or all elements in the DOM. This script reads the effective style of every such element and checks whether this style contains a background image and if it does which image is it. Then, the script sends the gathered information to the server where it can be used for optimization techniques, such as image combining, sorting image loading according to the visual position on the page and pre-fetching. It should be noted that this embodiment may be performed by a post-processing tool or the WPAA 140.

XII. Progressive Loading of Combined Resources of a Web Page

When combining resources trivially, every one of these resources is available only once the entire combined resource is loaded. This postpones the rendering of the first resource in the file until later resources are loaded.

According to an embodiment of the invention, the combined file is loaded progressively. For example, when loading a resource using AJAX, browsers read the resource chunk by chunk, returning the control to the AJAX callback function after each chunk. Thus, the following process can be used in the AJAX callback function to achieve progressively loading:

1) Checking that the function is called after a chunk and not because of an error;
2) Adding the new chunk to the existing chunks' buffer;
3) Parsing the chunks' buffer;
4) If new resources were found in the updates buffer then:
   4a) For every one of the new resources:
      Finding all elements which use the new resource, for example, image tags which point to the resource, now a part of the combined file; and
      Replacing the address the elements point to by the new resource is fully loaded and is now in the cache.

One example of using such a method is for the data:uri mechanism in modern browsers. Using it naively causes the browser to wait until the entire combined file is loaded. When applying the disclosed method, every time a resource finishes loading, it can be used by any elements, and placed by the script for use.

An addition to the process is to progressively load background images. Background images do not include any element, thus cannot be used in the manner described above. However, the following process can be applied:

1) Combining the style sheet definitions that contain background URLs to, for example one combined file, which also contains the data of the images. It should be noted that in some cases several combined files may be created;
2) Reading the combined file using AJAX;
3) Every time the control returns to the AJAX callback function the following is performed:
   3a) Adding the new chunk to the read data array;
   3b) Parsing the read data array to identify if any new classes were added; and
   3c) For every new class added, preferably in full, the new class is applied to the web page.

It should be noted that this embodiment may be performed by a post-processing tool or the WPAA 140.

The principles of the invention can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What is claimed is:

1. A system for acceleration of access to web pages, comprising:

a network interface enabling communication of one or more user nodes with one or more web servers over a network for accessing web pages stored in the one or more web servers;

an acceleration server coupled to the network interface for modifying web pages retrieved from the one or more web servers using at least one acceleration technique, the modified web pages accelerating access to the web page to one or more user nodes;

a first cache connected to the acceleration server and the one or more user nodes and operative to cache information associated with requests directed from the one or more the user nodes to the acceleration server;

a second cache connected to the acceleration server and the one or more web servers and operative to cache information associated with requests directed from the one or more web servers to the acceleration server; and a memory coupled to the acceleration server and containing a plurality of instructions respective of the at least one acceleration technique, wherein the at least one acceleration technique comprises:

forcing style data of a web page of the web pages to load overlapping in time with the rest of the data of the web page by moving the style data from the web page into at least an external file to the web page; and loading the at least external file asynchronously to loading of the web page.

2. A system for acceleration of access to web pages, comprising:

a network interface enabling communication of one or more user nodes with one or more web servers over a network for accessing web pages stored in the one or more web servers;

an acceleration server coupled to the network interface for modifying web pages retrieved from the one or more web servers using at least one acceleration technique, the modified web pages accelerating access to the web page to one or more user nodes;

a first cache connected to the acceleration server and the one or more user nodes and operative to cache information associated with requests directed from the one or more the user nodes to the acceleration server;

a second cache connected to the acceleration server and the one or more web servers and operative to cache information associated with requests directed from the one or more web servers to the acceleration server; and a memory coupled to the acceleration server and containing a plurality of instructions respective of the at least one acceleration technique, wherein the at least one acceleration technique comprises:

scanning a web page of the web pages for embedded scripts;

adding a script tag at each embedded script location; and moving each embedded script to an external file, wherein upon processing of the web page on a browser the original position of the script is processed without delay and when reaching execution of the script, the script is being written at its original position in a digital object model (DOM) of the web page.

3. The system of claim 2, wherein the at least one acceleration technique further comprises:

identifying functions that when executed from a new location in the web page cause erroneous behavior;

replacing the identified functions with new functions; and converting text passed to the identified functions into a sub-tree of the DOM; and inserting the sub-tree into the DOM at a marked location.

4. A system for acceleration of access to web pages, comprising:

a network interface enabling communication of one or more user nodes with one or more web servers over a network for accessing web pages stored in the one or more web servers;

an acceleration server coupled to the network interface for modifying web pages retrieved from the one or more web servers using at least one acceleration technique, the modified web pages accelerating access to the web page to one or more user nodes;

a first cache connected to the acceleration server and the one or more user nodes and operative to cache information associated with requests directed from the one or more the user nodes to the acceleration server;

a second cache connected to the acceleration server and the one or more web servers and operative to cache information associated with requests directed from the one or more web servers to the acceleration server; and a memory coupled to the acceleration server and containing a plurality of instructions respective of the at least one acceleration technique, wherein the at least one acceleration technique based on the capability of a respective browser comprises:

initiating remotely by the acceleration server at page download time, loading items of a web page of the accessed web pages into a browser's cache by performing at least one of: fetching the items into the browser's cache in parallel to the loading of the web page; fetching, into the browser's cache, the items that are in a same domain of the web page; and asynchronous loading the items that are not in the same domain of the web page into the browser's cache by using tags of loading external resources, and remotely causing by the acceleration server a post-processing parsing tool to insert into the web page a pre-fetch code that when executed by the browser on a user node causes the pre-fetch of items in the web page into the browser's cache.

5. A system for acceleration of access to web pages, comprising:

a network interface enabling communication of one or more user nodes with one or more web servers over a network for accessing web pages stored in the one or more web servers;

an acceleration server coupled to the network interface for modifying web pages retrieved from the one or more web servers using at least one acceleration technique, the modified web pages accelerating access to the web page to one or more user nodes;

a first cache connected to the acceleration server and the one or more user nodes and operative to cache information associated with requests directed from the one or more the user nodes to the acceleration server;

a second cache connected to the acceleration server and the one or more web servers and operative to cache information associated with requests directed from the one or more web servers to the acceleration server; and a memory coupled to the acceleration server and containing a plurality of instructions respective of the at least one acceleration technique, wherein the at least one acceleration technique comprises:

splitting a combined resource of the web page into a plurality of containers, wherein the number of container is above a predefined lower limit and below a predefined upper limit.

6. The system of claim 5, wherein the predefined lower limit and the predefined upper limit is determined to overcome a connection-per-domain limit of a user's browser.

7. A system for acceleration of access to web pages, comprising:

a network interface enabling communication of one or more user nodes with one or more web servers over a network for accessing web pages stored in the one or more web servers;

an acceleration server coupled to the network interface for modifying web pages retrieved from the one or more web servers using at least one acceleration technique, the modified web pages accelerating access to the web page to one or more user nodes;

a first cache connected to the acceleration server and the one or more user nodes and operative to cache information associated with requests directed from the one or more the user nodes to the acceleration server;

a second cache connected to the acceleration server and the one or more web servers and operative to cache information associated with requests directed from the one or more web servers to the acceleration server; and a memory coupled to the acceleration server and containing a plurality of instructions respective of the at least one acceleration technique, wherein the at least one acceleration technique comprises:

collecting elements of a web page including elements defined inside at least iframe tags;

sorting of resources to be displayed on a user node from the collected elements with respect of the Y axis of the display and postponing resources that are not in the viewport of the display;

modifying the web page by adding a script to the web page to asynchronously load elements which are in the viewport; and storing the modified web page in the second cache.

8. A system for acceleration of access to web pages, comprising:

a network interface enabling communication of one or more user nodes with one or more web servers over a network for accessing web pages stored in the one or more web servers;

an acceleration server coupled to the network interface for modifying web pages retrieved from the one or more web servers using at least one acceleration technique, the modified web pages accelerating access to the web page to one or more user nodes;

a first cache connected to the acceleration server and the one or more user nodes and operative to cache information associated with requests directed from the one or more the user nodes to the acceleration server;

a second cache connected to the acceleration server and the one or more web servers and operative to cache information associated with requests directed from the one or more web servers to the acceleration server; and a memory coupled to the acceleration server and containing a plurality of instructions respective of the at least one acceleration technique, wherein the at least one acceleration technique comprises:

determining if a page style of a web page contains a background image by analyzing the digital object model (DOM) of the web page using a client side script executed on one of the user nodes; and informing the acceleration server about the background image for the purpose of use of such information for future optimizations of the web page.

9. A system for acceleration of access to web pages, comprising:

a network interface enabling communication of one or more user nodes with one or more web servers over a network for accessing web pages stored in the one or more web servers;

an acceleration server coupled to the network interface for modifying web pages retrieved from the one or more web servers using at least one acceleration technique, the modified web pages accelerating access to the web page to one or more user nodes;

a first cache connected to the acceleration server and the one or more user nodes and operative to cache information associated with requests directed from the one or more the user nodes to the acceleration server;

a second cache connected to the acceleration server and the one or more web servers and operative to cache information associated with requests directed from the one or more web servers to the acceleration server; and a memory coupled to the acceleration server and containing a plurality of instructions respective of the at least one acceleration technique, wherein the at least one acceleration technique comprises:

parsing the web page to detect embedded scripts; and replacing the embedded scripts of the web page with replacement scripts, thereby postponing execution of the embedded scripts after the web page has been downloaded, wherein upon execution of replacement scripts any data written by the replacement scripts is written for the embedded scripts at their original positions in the web page.

10. A method for acceleration of access to a web page, comprising:

receiving a web page responsive to a request by a user;

analyzing the received web page for possible acceleration improvements;

generating a modified web page of the received web page using at least one of a plurality of acceleration techniques;

providing the modified web page to the user, wherein the user experiences an accelerated access to the modified web page resulting from the execution of the at least one of a plurality of acceleration techniques; and storing the modified web page for use responsive to future user requests, wherein the at least one of the plurality of acceleration techniques comprises:

forcing a style data of the web page to load overlapping in time with the rest of the data of the web page by moving the style data from the web page into at least an external file to the web page; and loading of the at least an external file asynchronously to loading of the web page.

11. A non-transitory computer readable medium having stored thereon instructions for causing one or more processing units to execute the method according to claim 10.

12. A method for acceleration of access to a web page, comprising:

receiving a web page responsive to a request by a user;

analyzing the received web page for possible acceleration improvements;

generating a modified web page of the received web page using at least one of a plurality of acceleration techniques;

providing the modified web page to the user, wherein the user experiences an accelerated access to the modified web page resulting from the execution of the at least one of a plurality of acceleration techniques; and storing the modified web page for use responsive to future user requests, wherein the at least one of the plurality of acceleration techniques comprises:

scanning the web page for embedded scripts;

adding a script tag at a representation of each embedded script location, the representation being in a document object model (DOM) of the web page; and moving each embedded script to an external file, wherein upon processing of the web page on a browser the original position of the script is processed without delay and when reaching execution of the script, the script is being written at its original position in the digital object model (DOM) of the web page.

13. A method for acceleration of access to a web page, comprising:

receiving a web page responsive to a request by a user;

analyzing the received web page for possible acceleration improvements;

generating a modified web page of the received web page using at least one of a plurality of acceleration techniques;

providing the modified web page to the user, wherein the user experiences an accelerated access to the modified web page resulting from the execution of the at least one of a plurality of acceleration techniques; and storing the modified web page for use responsive to future user requests, wherein the at least a one of the plurality of acceleration techniques comprises:

scanning the web page for embedded scripts;

adding a script tag at each embedded script location; and moving each embedded script to an external file, wherein upon processing of the web page on a browser the original position of the script is processed without delay and when reaching execution of the script, the script is being written at its original position in a digital object model (DOM) of the web page;

identifying functions that when executed from a new location in the web page cause erroneous behavior;

replacing the identified functions with new functions;

converting text passed to the identified functions into a sub-tree of the DOM; and inserting the sub-tree into the DOM at a marked location.

14. A method for acceleration of access to a web page, comprising:

receiving a web page responsive to a request by a user;

analyzing the received web page for possible acceleration improvements;

generating a modified web page of the received web page using at least one of a plurality of acceleration techniques;

providing the modified web page to the user, wherein the user experiences an accelerated access to the modified web page resulting from the execution of the at least one of a plurality of acceleration techniques; and storing the modified web page for use responsive to future user requests, wherein the at least one of the plurality of acceleration technique based on the capability of a respective browser comprises:

initiating by a server remotely from a browser during page download time loading items of the web page into a browser's cache by performing at least one of: fetching the items into the browser's cache in parallel to the loading of the web page; fetching, into the browser's cache, the items that are in a same domain of the web page; and asynchronous loading the items that are not in the same domain of the web page into the browser's cache by using tags of loading external resources, and inserting remotely by the server into the web page a pre-fetch code that when executed by the browser on a user node causes the pre-fetch of items in the web page into the browser's cache.

15. A method for acceleration of access to a web page, comprising:

receiving a web page responsive to a request by a user;

analyzing the received web page for possible acceleration improvements;

generating a modified web page of the received web page using at least one of a plurality of acceleration techniques;

providing the modified web page to the user, wherein the user experiences an accelerated access to the modified web page resulting from the execution of the at least one of a plurality of acceleration techniques; and storing the modified web page for use responsive to future user requests, wherein the at least one of the plurality of acceleration techniques comprises:

splitting a combined resource of the web page into a plurality of containers, wherein the number of containers is above a predefined lower limit and below a predefined upper limit.

16. The method of claim 15, wherein the predefined lower limit and the predefined upper limit is determined to overcome a connection-per-domain limit of a user's browser.

17. A method for acceleration of access to a web page, comprising:

receiving a web page responsive to a request by a user;

analyzing the received web page for possible acceleration improvements;

generating a modified web page of the received web page using at least one of a plurality of acceleration techniques;

providing the modified web page to the user, wherein the user experiences an accelerated access to the modified web page resulting from the execution of the at least one of a plurality of acceleration techniques; and storing the modified web page for use responsive to future user requests, wherein the at least one of the plurality of acceleration techniques comprises:

collecting elements of the web page including elements defined inside at least iframe tags;

sorting of resources to be displayed on a user's screen from the collected elements with respect of the Y axis of the display and postponing resources that are not in the viewport of the display;

modifying the web page by adding a script to the web page to asynchronously load elements which are in the viewport; and storing the modified web page in a cache memory.

18. A method for acceleration of access to a web page, comprising:

receiving a web page responsive to a request by a user;

analyzing the received web page for possible acceleration improvements;

generating a modified web page of the received web page using at least one of a plurality of acceleration techniques;

providing the modified web page to the user, wherein the user experiences an accelerated access to the modified web page resulting from the execution of the at least one of a plurality of acceleration techniques; and storing the modified web page for use responsive to future user requests, wherein the at least one of the plurality of acceleration techniques comprises:

parsing the web page to detect embedded scripts; and replacing the embedded scripts of the web page with replacement scripts, thereby postponing execution of the embedded scripts after the web page has been downloaded, wherein upon execution of a replacement script of the replacement scripts any data written by the replacement script is written for the embedded script at its original position in the web page.

* * * * *